US011129138B2

(12) United States Patent
Li et al.

(10) Patent No.: US 11,129,138 B2
(45) Date of Patent: Sep. 21, 2021

(54) RESOURCE SELECTION METHOD AND CORRESPONDING EQUIPMENT

(71) Applicant: Samsung Electronics Co., Ltd., Suwon-si (KR)

(72) Inventors: Yingyang Li, Beijing (CN); Shichang Zhang, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 16/347,070

(22) PCT Filed: Nov. 2, 2017

(86) PCT No.: PCT/KR2017/012361
§ 371 (c)(1),
(2) Date: May 2, 2019

(87) PCT Pub. No.: WO2018/084614
PCT Pub. Date: May 11, 2018

(65) Prior Publication Data
US 2020/0059897 A1 Feb. 20, 2020

(30) Foreign Application Priority Data

Nov. 2, 2016 (CN) .......................... 201610952312.1
Mar. 17, 2017 (CN) .......................... 201710161870.0

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 28/26* (2013.01);
(Continued)

(58) Field of Classification Search
CPC ....... H04W 72/02; H04W 4/40; H04W 28/26; H04W 72/0446; H04W 72/1257; H04W 74/0816
See application file for complete search history.

(56) References Cited

U.S. PATENT DOCUMENTS

2016/0295624 A1 10/2016 Novlan et al.
2019/0182840 A1* 6/2019 Feng ...................... H04W 4/44

OTHER PUBLICATIONS

Samsung, 'Details on sensing based resource (re)selection', R1-166714, 3GPP TSG RAN WG1 Meeting #86, Gothenburg, Sweden, Aug. 13, 2016.
(Continued)

*Primary Examiner* — Brenda H Pham
(74) *Attorney, Agent, or Firm* — Jefferson IP Law, LLP (57) ABSTRACT

According to the present disclosure, a resource selection method, characterized in that, comprising the steps of: sensing, within a sensing window, a Scheduling Assignment (SA) for other User Equipments (UEs), measuring a received power based on the SA, and sensing a received energy of each sub-channel of each subframe; selecting a corresponding resource based on the sensed SA, the received power and the received energy; and transmitting the selected resource to other UEs based on the SA to perform data transmission by the resource.

20 Claims, 6 Drawing Sheets

(51) Int. Cl.
  *H04W 28/26* (2009.01)
  *H04W 72/04* (2009.01)
  *H04W 72/12* (2009.01)
  *H04W 74/08* (2009.01)
(52) U.S. Cl.
  CPC ... *H04W 72/0446* (2013.01); *H04W 72/1257* (2013.01); *H04W 74/0816* (2013.01)

(56) References Cited

OTHER PUBLICATIONS

Ericsson, 'Support for smaller resource reservation periods in V2X', R1-1609734, 3GPP TSG RAN WG1 Meeting #86bis, Lisbon, Portugal, Sep. 30, 2016.
Huawei, Hisilicon, 'Details for supporting traffic with smaller periodicity on PC5 based V2V', R1-1609365, 3GPP TSG RAN WG1 Meeting #86bis, Lisbon, Portugal, Oct. 1, 2016.
Samsung, 'Discussion on congestion control', R1-1608990, 3GPP TSG RAN WG1 Meeting #86bis, Lisbon, Portugal, Oct. 1, 2016.
LG Electronics, CATT; 3GPP TSG RAN WG1 Meeting #86bis; WF on enhancement in step 2 for supporting shorter periodicity; R1-1610913; Oct. 10, 2016, Lisbon, Portugal.

* cited by examiner

FIG.10

RESOURCE SELECTION METHOD AND CORRESPONDING EQUIPMENT

CROSS-REFERENCE TO RELATED APPLICATION(S)

This application is a U.S. National Stage application under 35 U.S.C. § 371 of an International application number PCT/KR2017/012361, filed on Nov. 2, 2017, which is based on and claimed priority of a Chinese patent application number 201610952312.1, filed on Nov. 2, 2016 and of Chinese patent application number 201710161870.0 filed on Mar. 17, 2017, in the State Intellectual Property Office of the People's Republic of China, the disclosure of which are incorporated by reference herein in its entirety.

TECHNICAL FIELD

The present invention relates to wireless communication technologies, and in particular to a resource selection method and a corresponding equipment.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to its great potential value in the public safety field and the ordinary civil communication field, the device to device (D2D) communication technology has been accepted by the 3GPP standards. Since the D2D communication in the 3GPP is mainly specific to low-speed terminals, as well as V2X services having lower requirements on the time delay sensitivity and receiving reliability, the realized D2D functions are far unable to meet the user demands. Accordingly, in the subsequent 3GPP releases, further enhancing the functional framework of D2D has become a broad consensus for various communication terminal manufacturers and communication network equipment manufacturers nowadays. Wherein, based on the current D2D broadcast communication mechanism, supporting low-delay and high-reliability direct communications between high-speed equipments, between a high-speed equipment and a low-speed equipment and between a high-speed equipment and a static equipment, i.e., V2X (vehicle to vehicle/pedestrian/infrastructure/network), is one of functions to be standardized preferentially.

DISCLOSURE OF INVENTION

Solution to Problem

An objective of the present invention is to solve the processing of a small reservation interval in the resource selection process in order to avoid the collision and interference between equipments.

For this purpose, the present invention provides a resource selection method, comprising the steps of:

sensing, within a sensing window, a scheduling assignment (SA) for other user equipments (UEs), measuring a received power based on the SA, and sensing a received energy of each sub-channel of each subframe;

selecting a corresponding resource based on the sensed SA, the received power and the received energy; and transmitting the selected resource to other UEs based on the SA to perform data transmission by the resource.

Optionally, the step of selecting a corresponding resource based on the sensed SA, the received power and the received energy comprises at least one of the following methods:

when a reservation interval value indicated by the sensed SA is less than a preset reservation interval threshold, according to the resources scheduled by the SA and at the indicated reservation interval value, successively reserving a specified number of periods for resource selection;

when a reservation interval value indicated by an SA sensed within the last X subframes within the sensing window is less than the preset reservation interval threshold, according to the resources scheduled by the SA and at the indicated reservation interval value, successively reserving a specified number of periods for resource selection, wherein the X is equal to the reservation interval value indicated by the SA;

when the sensed SA indicates that a reserved resource is within a selection window, and a reservation interval value indicated by the SA is less than the preset reservation interval threshold, according to the resources scheduled by the SA and at the indicated reservation interval value, successively reserving a specified number of periods for resource selection;

when a reservation interval value indicated by the sensed SA is less than the preset reservation interval threshold, performing resource selection according to the resources scheduled by the SA and at the preset reservation interval value; and when the sensed SA indicates a reservation interval value and the number of reserved periods, and the reservation interval value is less than the preset reservation interval threshold, according to the resources scheduled by the SA and at the indicated reservation interval value, successively reserving the indicated number of reserved periods for resource selection.

Specifically, the specified number of periods is determined by a ratio of the reservation interval threshold to the reservation interval indicated by the SA.

Optionally, the value of the number of reserved periods is an integer from 0 to the ratio of the reservation interval threshold to the reservation interval indicated by the SA.

Optionally, the value of the number of reserved periods is 0, 1 or the ratio of the reservation interval threshold to the reservation interval indicated by the SA.

Wherein, when any reserved resource among the resources scheduled by the SA is within the selection window and the received power of the resources scheduled by the SA exceeds a threshold value, resources scheduled by the SA within the selection window are unavailable.

Specifically, the reservation interval value is expressed by a product value of the preset reservation interval threshold and a specified divisor, and the SA indicates the number of reserved periods by two codewords.

Optionally, the value of the specified divisor is ½ or ⅕.

A resource selection equipment is provided, comprising:

a sensing module, configured to sense, within a sensing window, an SA for other UEs, measure a received power based on the SA, and sense a received energy of each sub-channel of each subframe;

a resource selection module, configured to select a corresponding resource based on the sensed SA, the received power and the received energy; and a transceiver module, configured to receive an SA and a data channel from other UEs, and transmit the selected resource to the other UEs based on the SA to perform data transmission by the resource.

Advantageous Effects of Invention

With the method provided by the present invention, when an equipment performs resource selection by a sensing-based method, the collision between excessive reserved resources and the equipment can be avoided, and the performance of resource selection can be improved.

Additional aspects and advantages of the present invention will be partially appreciated and become apparent from the description below, or will be well learned from the practices of the present invention.

BRIEF DESCRIPTION OF DRAWINGS

The above and/or additional aspects and advantageous of the present invention will become apparent and be more readily appreciated from the following descriptions of embodiments, with reference to the accompanying drawings, in which.

MODE FOR INVENTION

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

In a V2X (vehicle to everything; vehicle to vehicle/pedestrian/infrastructure/network) system, there can be two structures for configuring a PSCCH (physical sidelink control channel) resource pool and a PSSCH (physical sidelink shared channel) resource pool. A PSCCH can be located on a same subframe as one PSSCH scheduled by the PSCCH; or, a PSCCH can also be not located on a same subframe as any one PSSCH scheduled by the PSCCH. Both the PSCCH resource pool and the PSSCH resource pool occupy a same subframe set. One PSCCH is fixedly mapped onto two PRBs (resource blocks). The allocation granularity for frequency resources is a sub-channel, and one sub-channel contains successive PRBs, where the number of PRBs is configured by a higher-layer signaling. Resources for one equipment can occupy one or more successive sub-channels. When the PSCCH and the PSSCH are located on a same subframe, the PSCCH and the PSSCH can occupy successive PRBs. In one or more successive sub-channels occupied by the resources for one equipment, two PRBs, for example, two PRBs having a lowest frequency, are used for bearing the PSCCH, and other PRBs are used for bearing the PSSCH. The number of PRBs actually occupied by the PSSCH also needs to satisfy a power of 2, 3 and 5. When the PSCCH and the PSSCH are located on a same subframe, PRBs for the PSCCH and PRBs for the PSSCH can also be not successive. In this case, a starting position of PRB of the PSCCH resource pool and a starting position of PRB of the PSSCH resource pool can be configured separately. The PSSCH resource pool still allocates resources by using a sub-channel as granularity. For an equipment, an index of the occupied PSCCH is equal to a minimum sub-channel index of the occupied PSSCH.

Figure 1:
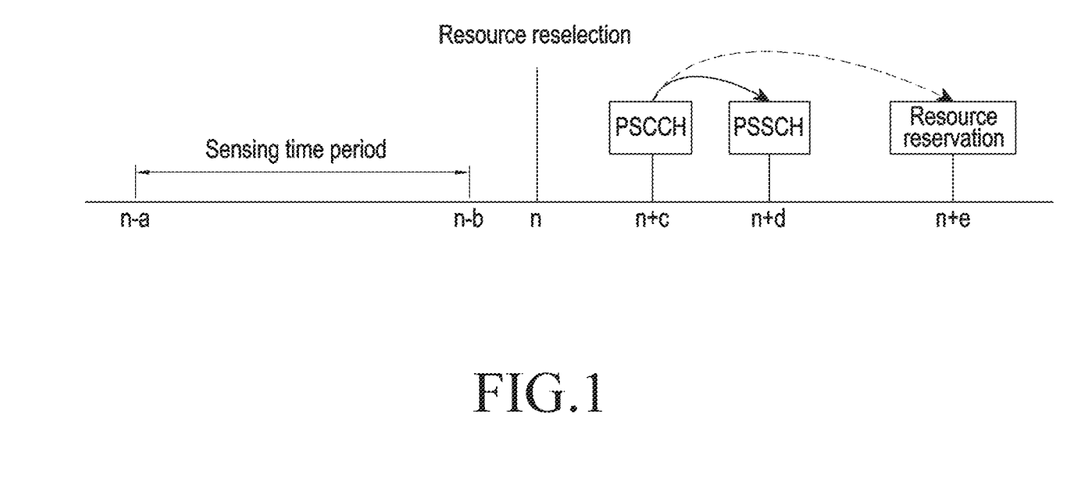
FIG. 1 is a schematic diagram of a resource selection method based on sensing.

In the V2X system, the collision problem and in-band leakage problem can be solved based on sensing. Here, a fundamental assumption is that the occupancy of resources by the equipment is semi-persistent scheduling (SPS). In other words, the resources occupied by the equipment are periodic within a period of time. As shown in FIG. 1, if the moment when the equipment selects PSCCH/PSSCH resources is a subframe n, the equipment first senses resources in its resource pool from a time period from a subframe n−a to a subframe n−b, and decides which time-frequency resources are occupied and which time-frequency resources are idle; then, the equipment selects PSCCH/PSSCH resources on the subframe n, where it is assumed that the PSCCH is transmitted on a subframe n+c, the PSSCH is transmitted on a subframe n+d, and a reserved resource is on a subframe n+e; subsequently, the equipment transmits the PSCCH on the subframe n+c, transmits the PSSCH on the subframe n+d, and transmits the next data on the subframe n+e as the reserved resource. Particularly, when c is equal to d, the PSCCH and the PSSCH are located on a same subframe. An interval between the subframe n+e and the subframe n+d is equal to a reservation interval I. The reservation interval I is equal to $P_{step} \cdot k$. For example, if $P_{step}$ is equal to 100, a time delay no more than about 100 ms is supported. The value range of the k is a set of all integers from 1 to 10 or a subset thereof. The value range of the k can be configured by a higher layer. During resource selection, the equipment can select k resources located on different subframes, that is, each data can be repeatedly transmitted for k times, where k is greater than or equal to 1. For example, k is equal to 2. Thus, the case where a part of equipments are unable to receive the data due to the limitations of the half-duplex operation is avoided. When k is greater than 1, each PSSCH can indicate all the k resources. An equipment can sense resources in its resource pool by two methods. One method is as follows: accurate information about channels occupied by other equipments is acquired based on the decoding of the PSCCH, so that a received power of a corresponding equipment can be measured, and resource occupancy and/or reservation is decided based on the received power and the reservation interval in the PSCCH. Another method is as follows: resource occupancy and/or reservation is decided based on the received energy. For a resource on a subframe x within a selection window, the received energy is an average value of the received energy of identical sub-channel resources on a subframe $x-P_{step} \cdot j$ within the sensing window. Comprehensively considering the two methods, the equipment can avoid occupying the same resources as other equipments for transmission as much as possible.

Figure 2:
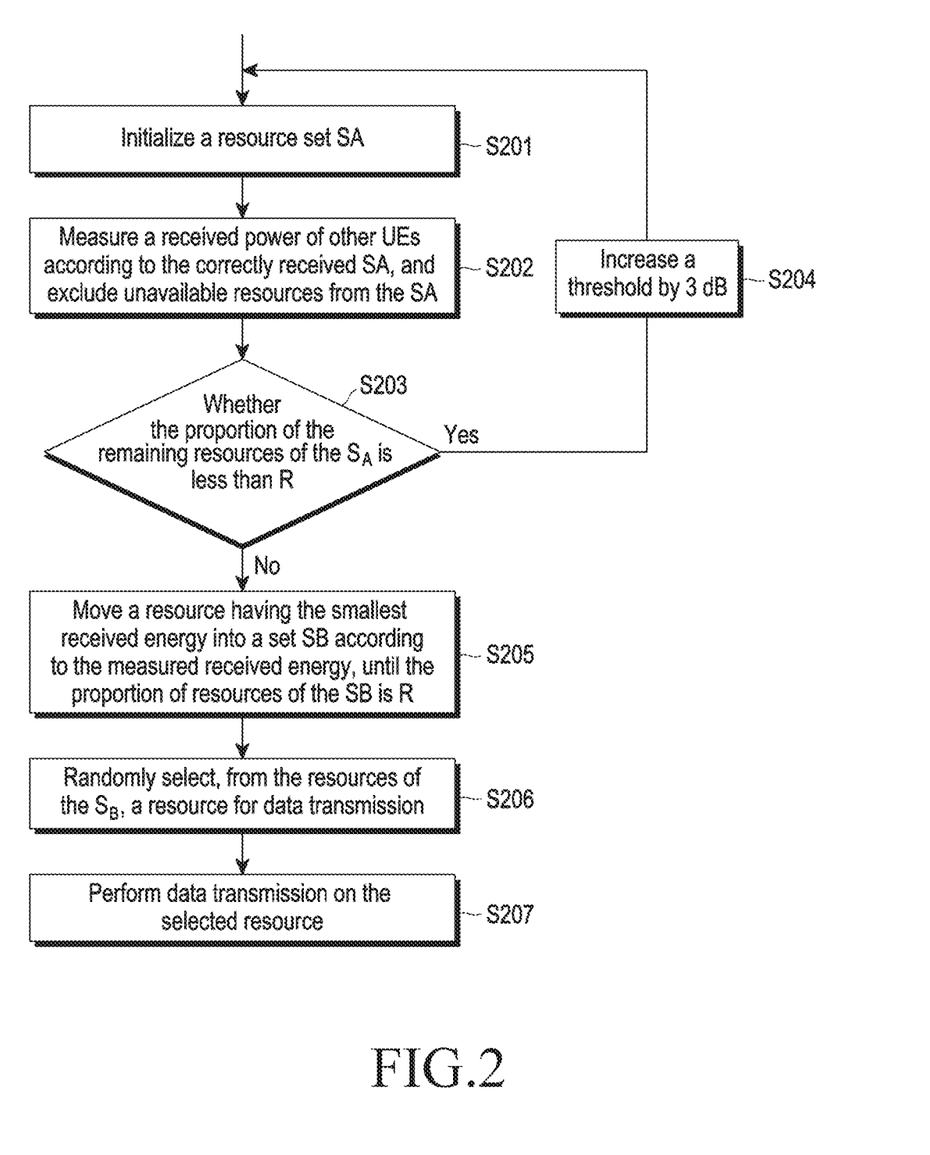
FIG. 2 is a flowchart of the resource selection method based on sensing.

FIG. 2 shows a schematic diagram of resource selection based on sensing. It is assumed that resource selection is performed on a subframe n, the reservation interval of a currently reserved resource for the equipment is $P_A$, and the number of periods requiring the reservation of resources is C. The equipment can select resources within a selection window $[n+T_1, n+T_2]$, and successively reserve C periods at the interval $P_A$. Both $T_1$ and $T_2$ depend upon the implementation of a UE. For example, $T_1 \leq 4$, and $20 \leq T_2 \leq 100$. $T_1$ depends upon the influence from a processing time delay from the resource selection by a UE to the time when the transmission of a scheduling assignment (SA) and data can start, and $T_2$ mainly depends upon the tolerable time delay characteristics of the current service. First, all resources within a selection window are set to be within a set $S_A$. So, the set $S_A$ is initialized to the union of all the candidate single-subframe resources (S201). Then, according to the correctly received SA, it is assumed that the SA indicates that resources are continuously reserved after the subframe n, a received power of a data channel scheduled by the SA is measured, and a part of candidate resources of the SA are excluded when the received power exceeds a corresponding threshold (S202). Specifically, when the received power exceeds the corresponding threshold, a resource Y reserved after the subframe n according to the SA is unavailable. The threshold is collectively determined by the priority of the equipment which performs the resource selection and the priority indicated by the correctly received SA. If $R_{x,y}$ denotes a single-subframe resource within the selection window $[n+T_1, n+T_2]$, and $R_{x,y}$ is located on a subframe y and contains one or more successive sub-channels starting from a sub-channel x, $R_{x,y}$ is unavailable for the equipment A when PRBs of $R_{x,y+j \cdot P_A}$ are overlapped with PRBs of the resource Y. That is, $R_{x,y}$ is excluded from the set $S_A$, where J=0, 1, ... C−1 and C is the number of periods in which the equipment A currently needs to reserve resources according to the period $P_A$. Then, it is decided whether the remaining resources in the $S_A$ reach a proportion R of the total resources, for example, 20% (S203). If the proportion is less than R, the threshold is increased by 3 dB (S204), and the S201 is executed again; or otherwise, S205 continues to be executed. In the S205, the received energy of the remaining resources in the $S_A$ is estimated, and a resource having the lowest received energy is moved to a set $S_B$ until the proportion of resources in the $S_B$ is R. For a resource containing a multiple of sub-channels, the received energy of this resource is an average value of the received energy of the sub-channels contained in the resource. Then, resources for data transmission are selected from the resources in the $S_B$ (S206), and are used for transmitting data (S207).

In the actual communication, there may be services which have more strict requirements on time delay, for example, 20 ms and 50 ms. In accordance with the discussions on the 3GPP at present, the V2X system further supports reservation intervals of 20 and 50. Effectively supporting a low-delay service by the method shown in FIG. 2 is needed.

In a V2X communication, equipments (UEs) participating in the communication can be classified into a multiple of categories, for example, vehicles (VUEs), pedestrians (PUEs), roadside units (RSUs) or more. It is assumed that a data transmission mechanism for a UE is as follows: the UE first transmits control channel for indicating information such as time-frequency resources occupied by a data channel and a modulation and coding scheme (MCS), which is hereinafter referred to as an SA (SA), and then, the UE transmits data on the scheduled data channel. For an LTE D2D/V2X system, the SA is also called a PSCCH, and the data channel is also called a PSSCH. For an equipment, since its data is basically generated periodically within a period of time, this equipment can periodically reserve resources at a certain reservation interval; and, each data can be repeatedly transmitted for k times, and k resources are to be reserved correspondingly, where k is greater than or equal to 1, so that the case where a part of equipments are unable to receive the data due to the limitations of the half-duplex operation is avoided.

Figure 3:
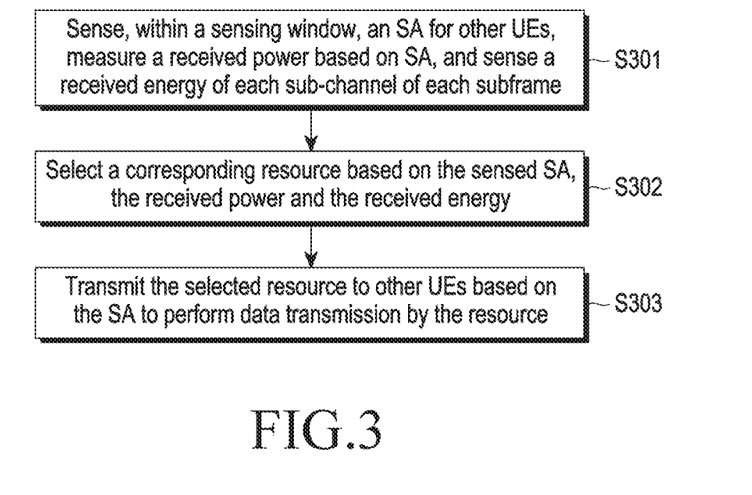
FIG. 3 is a principle flowchart of the resource selection method according to the present invention.

FIG. 3 is a principle flowchart of the resource selection method according to the present invention. As shown in FIG. 3, the resource selection method provided by the present invention comprises the following steps.

Step 301 (S301): A scheduling assignment (SA) for other user equipments (UEs) is sensed within a sensing window, a received power is measured based on the SA, and a received energy of each sub-channel of each subframe is sensed.

Acquiring resource information about other UEs by sensing the SA for other UEs, and deciding which resources are occupied and which resources are idle by those resource information, so that a UE which performs resource selection currently can perform resource selection more effectively.

Step 302 (S302): A corresponding resource is selected based on the sensed SA, the received power and the received energy.

The SA indicates the scheduled data channel resource, and indicates information about the reservation or release of this resource. For example, the SA contains reservation interval information. If the reservation interval information is equal to 0, it is indicated that the resource is released; and, if the resource interval information is greater than or equal to 1, it is indicated that a resource for the next transmission is reserved in accordance with the indicated reservation interval. It is assumed that a UE performs resource selection on a subframe n, the selection window is [n+$T_1$, n+$T_2$], and the length of the selection window is equal to L=$T_2$−$T_1$+1. When other UEs periodically reserve resources at a small reservation interval $I_2$, and $I_2$ is less than L, it is possible that the other UEs reserve resources on at most N subframes within the selection window of the UE, where N is equal to $\lfloor L/I_2 \rfloor$ or $\lceil L/I_2 \rceil$. Correspondingly, when the received power of the other UEs exceeds a threshold, in order to avoid the collision between UEs, the resources reserved within the at most N subframes are unavailable. For example, it is assumed that the length of the selection window of the UE is 100, and it is assumed that the UE receives an SA transmitted by a UE2 and the SA indicates a reservation interval of 20, the UE2 reserves resources within at most 5 subframes within the selection window. Correspondingly, when the reserved power exceeds the threshold, the resources reserved within the at most 5 subframes are unavailable for the UE.

Step 303 (S303): The selected resource is transmitted to other UEs based on the SA to perform data transmission by the resource.

The current user equipment (UE) transmits the selected resource to other equipments by the SA to inform the other UEs of the occupied resource, thereby avoiding the collision caused by the occupancy by other UEs. Accordingly, it is convenient for the current UE to transmit data by this resource.

Further, the present invention provides several specific embodiments below to further describe the Step 302 (S302) of the method provided by the present invention, so as to describe the resource selection process of the present invention in detail.

Embodiment 1

In the V2X system, a supportable reservation interval can be expressed by $P_{step}·k$. Wherein, k can be an integer from 1 to 10. In addition, a reservation interval less than $P_{step}$ can also be supported. For example, k can be ⅕ and/or ½. The value range of k can be configured by a higher layer. $P_{step}$ can be equal to 100. Or, after some subframes unavailable for V2X transmission are excluded, for example, downlink subframes for a TDD system or more, it is possible that $P_{step}$=100·R, in accordance with the proportion R of the number of subframes available for V2X and the total number of subframes. It is assumed that the length of the selection window is equal to $P_{step}$, the time delay of the supported service does not exceed about 100 ms.

For a small reservation interval $I_2$, $I_2$ is less than $P_{step}$, and $I_2$ is a divisor of $P_{step}$. For example, it is assumed $P_{step}$ is 100, 100 can be exactly divided by the reservation intervals 20 and 50. It is assumed that a UE2 reserves resources at the reservation interval $I_2$, and when the UE2 transmits an SA, the reservation interval $I_2$ or the release of resources can be indicated by the SA. In this way, for a UE which is performing sensing, upon receiving the SA transmitted by the UE2, the UE can know the reservation interval $I_2$ of the UE2, and then the UE can further decide whether to perform resource reservation for this SA.

A first processing method is as follows: when the UE receives an SA and this SA indicates the reservation interval $I_2$, according to the resources scheduled by this SA and at the reservation interval $I_2$, the UE successively reserves $P_{step}/I_2$ periods to perform resource selection. Based on the resource selection method in FIG. 2, $R_{x,y}$ denotes a single-subframe resource within the selection window, and $R_{x,y}$ is located on a subframe logic index y (A logic index refers to that re-indexing can only be performed on subframes which could belong to a data channel resource pool in sequence), and contains one or more successive sub-channel starting from the sub-channel x. When $R_{x,y+j·P_A}$ is overlapped with any one of resources reserved within the $P_{step}/I_2$ successive periods and when the received power of the resources scheduled by the SA exceeds a threshold, j is non-negative integer, $R_{x,y}$ is unavailable for the equipment A. Or, for any one of resources reserved within the $P_{step}/I_2$ successive periods, if the resource is within a selection window, and when the received power of the resources scheduled by the SA exceeds a threshold, the reserved resources within the selection window are unavailable. In this way, by using the reservation interval $I_2$ as a period, when a SA is sensed within the $P_{step}/I_2$ successive periods before a subframe n on which resource selection is performed, and the SA indicates reservation interval $I_2$, this SA may influence the resource selection of the UE within the selection window.

A second processing method is as follows: for the reservation interval $I_2$, only when the UE senses an SA within last $I_2$ subframes of a sensing window and the SA indicates the reservation interval $I_2$, according to the resources scheduled by this SA and at the reservation interval $I_2$, the UE successively reserves $P_{step}/I_2$ periods to perform resource selection. For example, it is assumed that resource selection is performed on a subframe n by the UE and n is an index of the physical subframe, on previous $I_2$ subframes which could belong to a data channel resource pool before the physical subframe of index n, when the UE senses an SA and the SA indicates the reservation interval $I_2$, according to the resources scheduled by this SA and at the reservation interval $I_2$, the UE successively reserves $P_{step}/I_2$ periods to perform resource selection. For example, it is assumed that resource selection is performed on a subframe n by the UE and n is an index of the physical subframe, n' is a logic index of a first subframe which could belong to a data channel resource pool in the physical subframe of index n and its subsequent subframes. When the UE senses an SA in the logic index range [n'−$I_2$, n'−1] and the SA indicates the reservation interval $I_2$, according to the resources scheduled by this SA and at the reservation interval $I_2$, the UE successively reserves $P_{step}/I_2$ periods to perform resource selection. For example, it is assumed that resource selection is performed on a subframe n by the UE and n is a logic index of the subframe, when the UE senses an SA in the logic index range [n−$I_2$, n−1] and the SA indicates the reservation interval $I_2$, according to the resources scheduled by this SA and at the reservation interval $I_2$, the UE successively reserves $P_{step}/I_2$ periods to perform resource selection.

Figure 4:
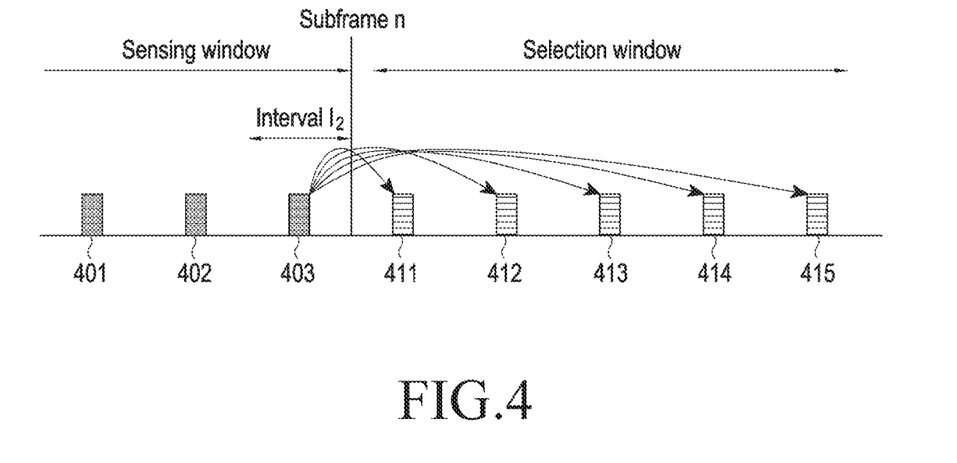
FIG. 4 is a schematic diagram of processing an SA within a last reservation interval of a sensing window according to the present invention.
Figure 5:
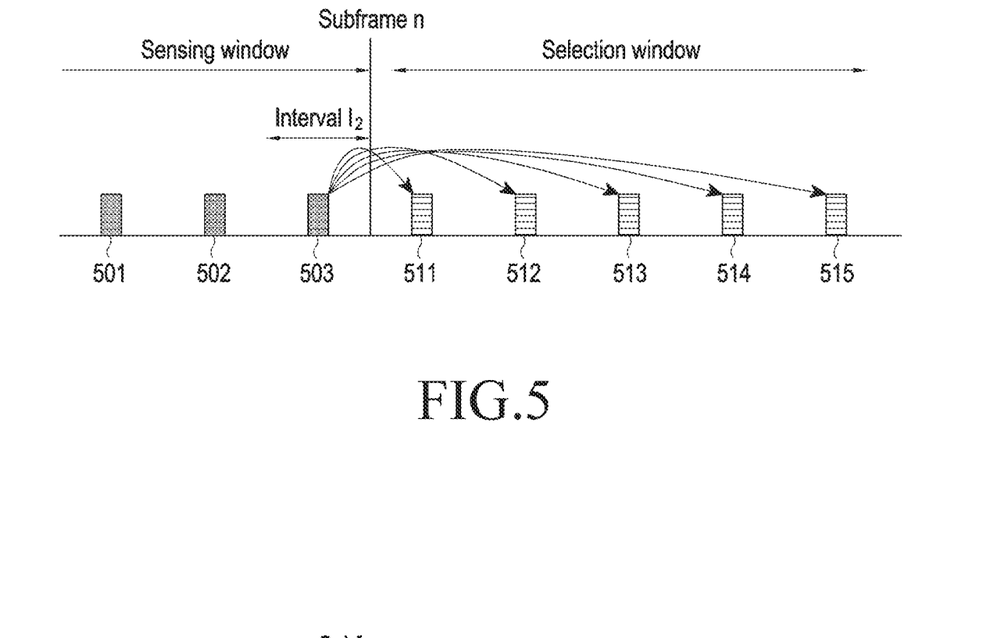
FIG. 5 is a schematic diagram of performing resource selection according to whether a reserved resource is within a selection window according to an embodiment of the present invention.

Based on the resource selection method in FIG. 2, $R_{x,y}$ denotes a single-subframe resource within the selection window, and $R_{x,y}$ is located on subframe logic index y and contains one or more successive sub-channel starting from the sub-channel x. When $R_{x,y+j·P_A}$ is overlapped with any one of resources reserved within the $P_{step}/I_2$ successive periods, if the resource is within the selection window, and when the received power of the resources scheduled by the SA exceeds a threshold, the reserved resources within the selection window are unavailable. It is assumed that $P_{step}$ is equal to 100, $I_2$ is equal to 20. As shown in FIG. 4, after an SA is received within last 20 subframes of the sensing window (403) and the SA indicates a reservation interval of 20, the UE reserves, according to the resources scheduled by the SA, five resources to perform resource selection, and all the 5 reserved resources (411-415) can be within the selection window. In other words, when the current received power is greater than the threshold, the 5 reserved resources are unavailable. For other SAs (401 and 402), since the SAs are not within the last 20 subframes of the sensing window, it is considered that the resources scheduled by the SAs are reserved only once, so that the influence from the SAs will not be taken into consideration during resource selection. As shown in FIG. 5, after an SA (503) is received within last 20 subframes of the sensing window and this SA indicates a reservation interval of 20, the UE reserves, according to the resources scheduled by the SA, five resources to perform resource selection. The first reserved resource (511) is not within the selection window, while the last 4 reserved resources (512-515) are within the selection window, so the resource selection can be performed according to the last 4 reserved resources. In other words, when the current received power is greater than the threshold, the 4 reserved resources are unavailable. For other SAs (501 and 502), since the SAs are not within the last 20 subframes of the sensing window, it is considered that the resources scheduled by the SAs are reserved only once, so that the influence from the SAs will not be taken into consideration during resource selection.

A third processing method is as follows: it is assumed that resource selection is performed on a subframe n by the UE and n is an index of the physical subframe, for the reserved interval $I_2$, only when the UE senses an SA in the latest $I_2$ subframes before the subframe n, in other words, in the physical subframe index range [n-$I_2$, n-1], and the SA indicates the reservation interval $I_2$, according to the resources scheduled by this SA and at the reservation interval $I_2$, the UE successively reserves $P_{step}/I_2$ periods to perform resource selection. Based on the resource selection method in FIG. 2, $R_{x,y}$ is a single-subframe resource within the selection window, and $R_{x,y}$ is located on subframe logic index y, and contains one or more successive sub-channel starting from the sub-channel x. When $R_{x,y+j \cdot P_A}$ is overlapped with any one of resources reserved within the $P_{step}/I_2$ successive periods, if the resource is within a selection window, and when the received power of the resources scheduled by the SA exceeds a threshold, the reserved resources within the selection window are unavailable.

Figure 6:
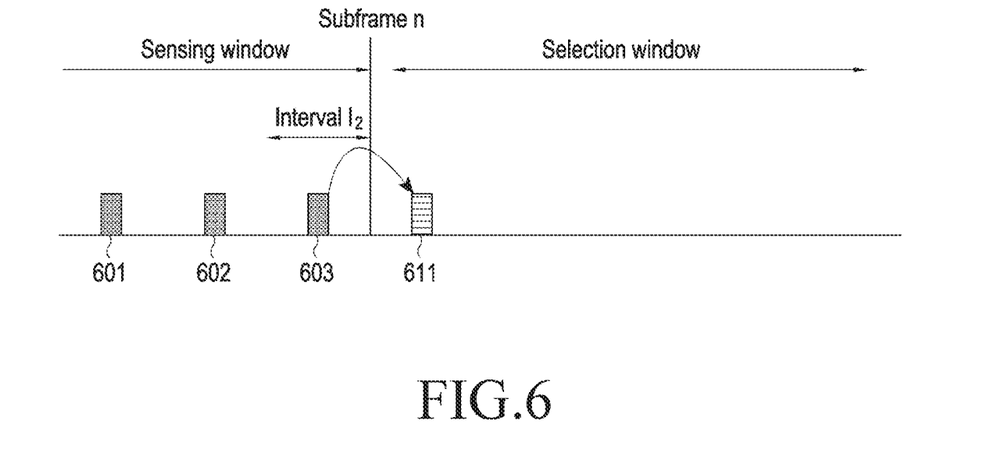
FIG. 6 is a schematic diagram of performing resource selection according to whether a reserved resource is within a selection window according to another embodiment of the present invention.

A fourth processing method is as follows: when the UE receives an SA, this SA indicates the reservation interval $I_2$, and the resources reserved by the SA are within the selection window, according to the resources scheduled by this SA and at the reservation interval $I_2$, the UE successively reserves $P_{step}/I_2$ periods to perform resource selection. Based on the resource selection method in FIG. 2, $R_{x,y}$ is a single-subframe resource within the selection window, and $R_{x,y}$ is located at subframe logic index y, and contains one or more successive sub-channel starting from the sub-channel x. When $R_{x,y+j \cdot P_A}$ is overlapped with any one of resources reserved within the $P_{step}/I_2$ successive periods and when the received power of the resources scheduled by the SA exceeds a threshold, j is non-negative integer, $R_{x,y}$ is unavailable for the equipment A. Or, for any one of resources reserved within the $P_{step}/I_2$ successive periods, if the resource is within a selection window, and when the received power of the resources scheduled by the SA exceeds a threshold, the reserved resources within the selection window are unavailable. It is assumed that $P_{step}$ is equal to 100, $I_2$ is equal to 20. As shown in FIG. 4, the SA (403) indicates a reservation interval 20 and the resources (411) reserved by the SA are within the selection window, the UE reserves, according to the resources scheduled by the SA, five resources to perform resource selection, and all the 5 reserved resources (411-415) can be within the selection window. In other words, when the current received power is greater than the threshold, the 5 reserved resources are unavailable. For other SAs (401 and 402), since the resources reserved at the reservation interval of 20 are not within the last 20 subframes of the sensing window, it is considered that the resources scheduled by the SAs are reserved only once, so that the influence from the SAs will not be taken into consideration during resource selection. As shown in FIG. 6, the SA (603) indicates a reservation interval of 20 and the resources (611) reserved by this SA are beyond the selection window, it is considered that the resources scheduled by this SA are reserved only once, so that the influence from this SA will not be taken into consideration during resource selection Embodiment 2

In the V2X system, a supportable reservation interval can be expressed by $P_{step} \cdot k$. Wherein, k can be an integer from 1 to 10. In addition, a reservation interval less than $P_{step}$ can also be supported. For example, k can be ⅕ and/or ½. The value range of k can be configured by a higher layer. $P_{step}$ can be equal to 100. Or, after some subframes unavailable for V2X transmission are excluded, for example, downlink subframes for a TDD system or more, it is possible that $P_{step}=100 \cdot R$, in accordance with the proportion R of the number of subframes available for V2X and the total number of subframes. It is assumed that the length of the selection window is equal to $P_{step}$, the time delay of the supported service does not exceed about 100 ms.

For a small reservation interval $I_2$, $I_2$ is less than $P_{step}$, and $I_2$ is a divisor of $P_{step}$. For example, it is assumed $P_{step}$ is 100, 100 can be exactly divided by the reservation intervals 20 and 50. The resources reserved at the reservation interval $I_2$ can be regarded as $P_{step}/I_2$ groups of resources which are simultaneously reserved, and the reservation interval for each group of resources is $P_{step}$. For example, for each group of resources, $C_{reed}$ periods are reserved at the reservation interval $P_{step}$, where $C_{reed}$ is the number of periods of resources reserved at the reservation interval $P_{step}$. Correspondingly, when a UE2 adopting the reservation interval $I_2$ transmits an SA, the reservation interval information in the SA can also be set according to the $P_{step}/I_2$ groups of occupied resources and the reservation interval $P_{step}$ for each group of resources. In other words, the reservation interval in the SA indicates $P_{step}$ rather than $I_2$. When the number of the remaining periods required by the UE2 to occupy the reserved resources is greater than or equal to $P_{step}/I_2$, the SA indicates the reservation interval $P_{step}$; or otherwise, the SA indicates 0.

Figure 7:
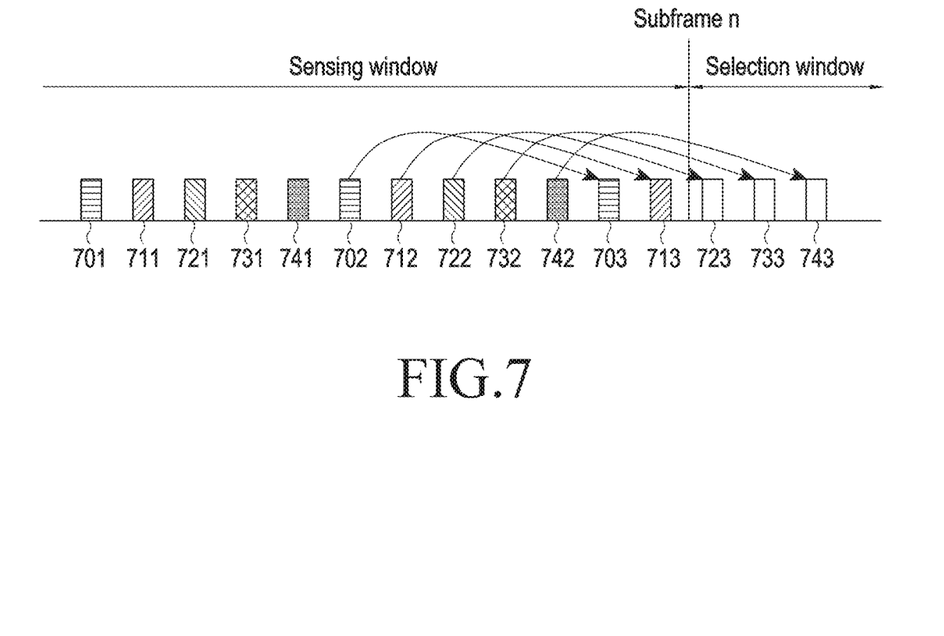
FIG. 7 is a schematic diagram of processing a small reservation interval by dividing a multiple of groups of resources according to the present invention.

In this way, for a UE which is performing sensing, upon receiving the SA transmitted by the UE2, the UE actually does not know the actual reservation interval of the UE2, so the UE can only process the resource reservation of the UE2 according to the reservation interval $P_{step}$. For a sub-channel on a subframe x within the selection window, the received energy is an average value of the received energy of identical sub-channels on a subframe $x-P_{step} \cdot j$ within the sensing window, where j=1, 2, . . . , $I_{max}$ and $I_{max}$ is a maximum value of the reservation interval. For example, $I_{max}=10$. In this way, since the SA indicates $P_{step}$ rather than $I_2$, and It is assumed that the UE receives one SA from the UE2 but does not receive a next SA having an interval $I_2$ from this SA, the UE is unable to process the resource occupancy or reservation of the next SA. As shown in FIG. 7, it is assumed that $P_{step}$ is equal to 100, $I_2$ is equal to 20, so the UE2 equivalently occupies 5 groups of resources, wherein an SA (702) merely indicates a reserved resource (703), an SA (712) merely indicates a reserved resource (713), an SA (722) merely indicates a reserved resource (723), an SA (732) merely indicates a reserved resource (733) and an SA (742) merely indicates a reserved resource (743). Wherein, the reserved resources (723, 733 and 743) are within the selection window, so it is required to consider the 3 reserved resources during resource selection. In other words, when the current reserved power is greater than the threshold, the 3 reserved resources are unavailable.

Embodiment 3

In the V2X system, a supportable reservation interval can be expressed by $P_{step} \cdot k$. Wherein, k can be an integer from 1 to 10. In addition, a reservation interval less than $P_{step}$ can also be supported. For example, k can be ⅕ and/or ½. The value range of k can be configured by a higher layer. $P_{step}$ can be equal to 100. Or, after some subframes unavailable for V2X transmission are excluded, for example, downlink subframes for a TDD system or more, it is possible that $P_{step}=100 \cdot R$, in accordance with a proportion R of the number of subframes available for V2X and the total number of subframes. It is assumed that the length of the selection window is equal to $P_{step}$, the time delay of the supported service does not exceed about 100 ms.

For a small reservation interval $I_2$, $I_2$ is less than $P_{step}$, and $I_2$ is a divisor of $P_{step}$. For example, it is assumed $P_{step}$ is 100, 100 can be exactly divided by the reservation intervals 20 and 50. It is assumed that a UE2 reserves resources according to the reservation interval $I_2$, and the UE2, when transmitting an SA, can indicate the reservation interval $I_2$ in the SA, and further indicate the number J of periods of resources reserved at the reservation interval $I_2$, where the value range of J is all integers from 0 to $P_{step}/I_2$. When the number of the remaining periods required by the UE2 to occupy the reserved resources is greater than or equal to $P_{step}/I_2$, the SA indicates that J is equal to $P_{step}/I_2$; when the number of remaining reserved periods required by the UE2 to occupy the reserved resources is less than $P_{step}/I_2$, the SA indicates that J is equal to the number of the remaining periods required to occupy the reserved resources; and, when the UE2 does not reserve resources, the SA indicates that J is equal to 0.

In this way, for a UE which is performing sensing, upon receiving the SA transmitted by the UE2, the UE can know the actual reservation interval $I_2$ of the UE2 and the number J of periods of resources reserved at the reservation interval $I_2$. When J is equal to $P_{step}/I_2$, the UE knows that the resources for the UE2 are at least reserved for $P_{step}/I_2$ periods, and the UE performs resource selection according to the resources for the UE2 reserved for $P_{step}/I_2$ periods; and, when J is less than $P_{step}/I_2$, the UE knows the actual number of times of continuously occupying the resources for the UE2. Thus, the UE can accurately obtain the number of subframes on which the UE2 reserves resources within the selection window of the UE.

For a sub-channel on a subframe x within the selection window, the received energy is an average value of the received energy of identical sub-channels on a subframe $x-P_{step} \cdot j$ within the sensing window, where $j=1, 2, \ldots, I_{max}$; or, the received energy is an average value of the received energy of identical sub-channels on a subframe $x-I_2 \cdot j$ within the sensing window, where j is a positive integer; or, the received energy is an average value of the received energy of identical sub-channels on a subframe $x-I_2 \cdot j$ within the sensing window, where $j=1, 2, \ldots, I_{max}$.

In this way, the number J of periods of resources reserved at the reservation interval $I_2$ needs to be indicated in the SA, where the value range of J is all integers from 0 to $P_{step}/I_2$. It is assumed that $P_{step}$ is equal to 100 and $I_2$ is equal to 20, the value range of J is from 0 to 5. Since a codeword 0 of the reservation interval can be set to indicate "NOT RESERVE RESOURCES", when $I_2$ is equal to 20, other five values of J need to be distinguished additionally. In addition, when $I_2$ is equal to 50, two values of J need to be distinguished additionally. It is assumed that the seven values and other 10 types of reservation intervals are jointly encoded, the number of the required codewords is 18, i.e., exceeding 4 bits information. This can be indicated by expanding the reservation interval to 5 bits, or indicated by a 4-bit reservation interval and 1 reserved bit. The specified indication method is not limited in the present invention.

Embodiment 4

In the V2X system, a supportable reservation interval can be expressed by $P_{step} \cdot k$. Wherein, k can be an integer from 1 to 10. In addition, a reservation interval less than $P_{step}$ can also be supported. For example, k can be ⅕ and/or ½. The value range of k can be configured by a higher layer. $P_{step}$ can be equal to 100. Or, after some subframes unavailable for V2X transmission are excluded, for example, downlink subframes for a TDD system or more, it is possible that $P_{step}=100 \cdot R$, in accordance with a proportion R of the number of subframes available for V2X and the total number of subframes. It is assumed that the length of the selection window is equal to $P_{step}$, the time delay of the supported service does not exceed about 100 ms.

For a small reservation interval $I_2$, $I_2$ is less than $P_{step}$, and $I_2$ is a divisor of $P_{step}$. For example, it is assumed that $P_{step}$ is 100, 100 can be exactly divided by the reservation intervals 20 and 50. It is assumed that a UE2 reserves resources according to the reservation interval $I_2$, and the UE2, when transmitting an SA, can indicate the reservation interval $I_2$ in the SA, and further indicate the number J of periods of resources reserved at the reservation interval $I_2$, where the value of J can be 0, 1 or $P_{step}/I_2$. When the number of the remaining periods required by the UE2 to occupy the reserved resources is greater than or equal to $P_{step}/I_2$, the SA indicates that J is equal to $P_{step}/I_2$; when the number of remaining reserved periods required by the UE2 to occupy the reserved resources is less than $P_{step}/I_2$, the SA indicates that J is equal to 1; and, when the UE2 does not reserve resources, the SA indicates that J is equal to 0.

In this way, for a UE which is performing sensing, upon receiving the SA transmitted by the UE2, the UE can know the actual reservation interval $I_2$ of the UE2 and the number J of periods of resources reserved according to the reservation interval $I_2$. When J is equal to $P_{step}/I_2$, the UE knows that the resources for the UE2 are at least reserved for $P_{step}/I_2$ periods, and the UE can perform resource selection according to the resources for the UE2 reserved for $P_{step}/I_2$ periods at the reservation interval $I_2$; and, when J is equal to 1, the UE knows that the actual number of times of continuously occupying the resources for the UE2 is less than $P_{step}/I_2$, and the UE can perform resource selection according to the resources for the UE2 reserved one period at the reservation interval $I_2$, when no other SA indicates the more number of periods of continuously occupying the resources at the reservation interval $I_2$. Thus, when the UE receives, from the UE2 before the selection window, the last SA indicative of J being equal to $P_{step}/I_2$, so this method still can better avoid the collision between UEs.

For a sub-channel on a subframe x within the selection window, the received energy is an average value of the received energy of identical sub-channels on a subframe $x-P_{step}\cdot j$ within the sensing window, where $j=1, 2, \ldots, I_{max}$; or, the received energy is an average value of the received energy of identical sub-channels on a subframe $x-I_2\cdot j$ within the sensing window, where j is a positive integer; or, the received energy is an average value of the received energy of identical sub-channels on a subframe $x-I_2\cdot j$ within the sensing window, where $j=1, 2, \ldots, I_{max}$.

In this way, the number J of periods of resources reserved at the reservation interval $I_2$ needs to be indicated in the SA, where the value range of J can be 0, 1 or $P_{step}/I_2$. It is assumed that $P_{step}$ is equal to 100 and $I_2$ is equal to 20, the value range of J is 0, 1 and 5; and, it is assumed that $I_2$ is equal to 50, the value range of J is 0, 1 and 2. Since a codeword 0 of the reservation interval can be set to indicate "NOT RESERVE RESOURCES", when $I_2$ is equal to 20 or 50, two values of J need to be distinguished additionally. It is assumed that the four values and other 10 reservation intervals are jointly encoded, the number of required codewords is 15, which still can be indicated by 4-bit information. Specifically, for a reservation interval $P_{step}\cdot k$ (where $k=1, 2, \ldots, I_{max}$), the reservation interval is indicated by one codeword; for a reservation interval $P_{step}\cdot k$ (where $k=\frac{1}{2}, \frac{1}{5}$), the number of periods of resources reserved at the reservation interval $P_{step}\cdot k$ is indicated as 1 or 1/k by two codewords, and the other codeword indicates "NOT RESERVE RESOURCES", for example, 0.

Figure 8:
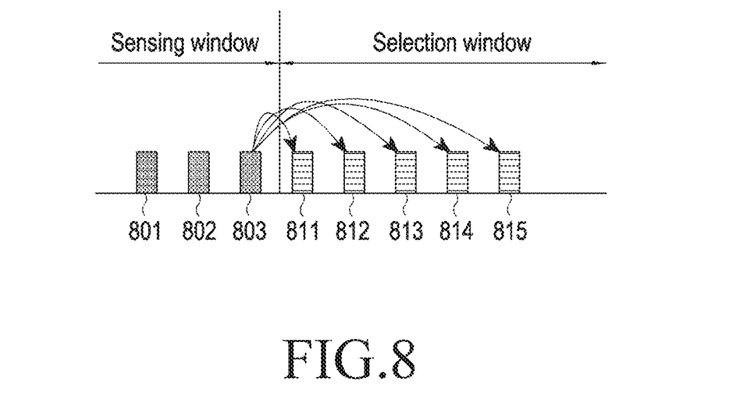
FIG. 8 is a schematic diagram of distinguishing the number of resource reservation times as 1 and 5 according to an embodiment of the present invention.

As shown in FIG. 8, it is assumed that $P_{step}$ is equal to 100, $I_2$ is equal to 20, and an SA (803) indicates a reservation interval of 20 and indicates that 5 periods are reserved successively, this SA indicates reserved resources (811-815), and the 5 reserved resources are within the selection window. Thus, the 5 reserved resources need to be taken into consideration during resource selection. In other words, when the current received power is greater than the threshold, the 5 reserved resources are unavailable.

Figure 9:
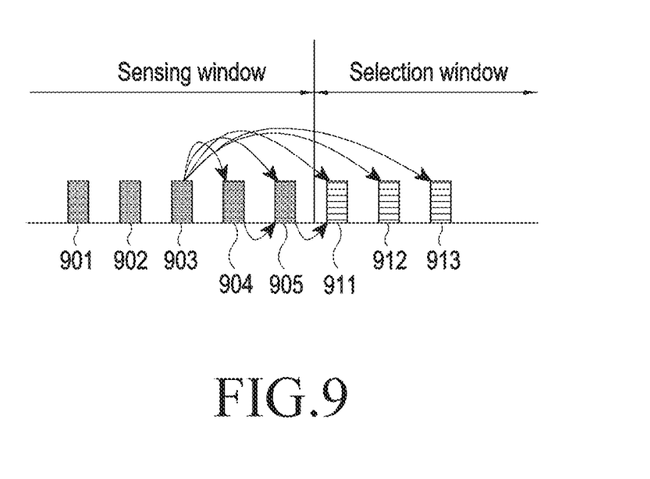
FIG. 9 is a schematic diagram of distinguishing the number of resource reservation times as 1 and 5 according to another embodiment of the present invention.

As shown in FIG. 9, it is assumed that $P_{step}$ is equal to 100, $I_2$ is equal to 20, and an SA (903) indicates a reservation interval of 20 and indicates that 5 periods are reserved successively, this SA indicates reserved resources (904, 905, 911-913). In addition, an SA (904) indicates a reserved resource (905), and an SA (905) indicates a reserved resource (911). Wherein, the reserved resources (911-913) are within the selection window, so the 3 reserved resources need to be taken into consideration during resource selection. In other words, when the current reserved power is greater than the threshold, the 3 reserved resources are unavailable.

Figure 10:
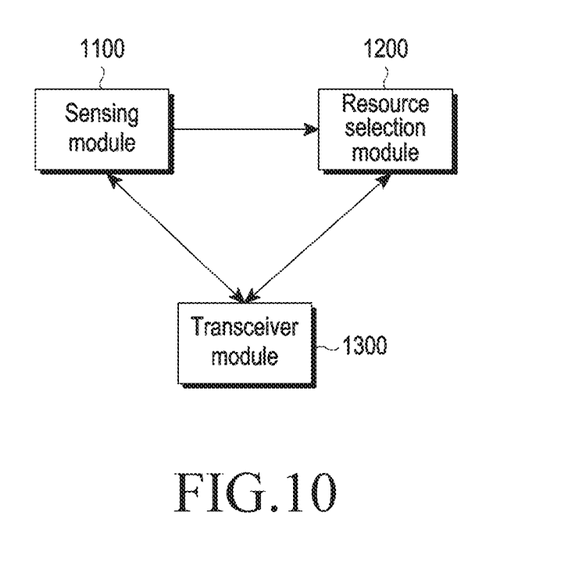
FIG. 10 is a structural block diagram of the resource selection equipment according to the present invention.

Corresponding to the method, as shown FIG. 10, the present invention further provides a resource selection equipment. The equipment can be used for implementing the method. The equipment comprises a sensing module 1100, a resource selection module 1200 and a transceiver module 1300, wherein:

the sensing module 11 is configured to sense, within a sensing window, a scheduling assignment (SA) for other UEs, measure a received power based on the SA, and sense a received energy of each sub-channel of each subframe;

the resource selection module 1200 is configured to select a corresponding resource based on the sensed SA, the received power and the received energy; and the transceiver module 1300 is configured to receive an SA and a data channel from other UEs, transmit the selected resource to the other UEs based on the SA to perform data transmission by the resource.

According to an embodiment of the present invention the sensing module 1100, the resource selection module 1200, and the transceiver module 1300 may be implemented by a processor or a transceiver of the equipment.

In the solutions of the present invention, the specific function implementation of each module in the resource selection equipment provided herein can refer to the specific steps of the resource selection method described above, and will not be repeated here.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium mentioned above can be a read-only memory, a magnetic disk, an optical disk, or more.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

What is claimed is:

1. A method for transmitting data by a user equipment (UE), the method comprising:
   receiving, in a subframe m, a scheduling assignment (SA) within a range of a value associated with a resource reservation interval before the UE determines, in a subframe n, resources for a physical sidelink shared channel (PSSCH) transmission;
   determining, in the subframe n, the resources for the PSSCH transmission based on the SA; and
   transmitting data in the resources for the PSSCH transmission,
   wherein a range between the subframe n and the subframe m is less than or equal to the value associated with the resource reservation interval.

2. The method of claim 1, further comprising:
   identifying a set of candidate single-subframe resources; and
   identifying one or more single-subframe resources to be excluded from the set of the candidate single-subframe resources, wherein the one or more single-subframe resources are overlapped with resource blocks determined according to the SA,
   wherein one or more subframes in which the one or more single-subframe resources are located are determined based on the resource reservation interval and a subframe in which the candidate single-subframe resource is located, and wherein the resource for the transmitting the data is selected based on candidate single-subframe resources remaining in the set of the candidate single-subframe resources.

3. The method of claim 2, further comprising:
sensing, within a sensing window, the SA;
measuring a received power based on the SA; and
sensing a received energy of each sub-channel of each candidate single-subframe,
wherein the candidate single-subframe resource is identified further based on the sensed SA, the received power and the received energy.

4. The method of claim 3, further comprising:
reserving a specified number of periods for resource selection, at the resource reservation interval, according to the candidate single-subframe resources remaining in the set of the candidate single-subframe resources,
wherein the resource reservation interval is indicated by the SA.

5. The method of claim 4, wherein the specified number of periods for the resource selection is indicated by the SA.

6. The method of claim 5,
wherein the SA indicates the specified number of periods for resource selection by two codewords.

7. The method of claim 4,
wherein the specified number of periods is determined by a ratio of a parameter $P_{step}$ to the resource reservation interval indicated by the SA, and
wherein the parameter $P_{step}$ is a parameter for sidelink transmission.

8. The method of claim 7, wherein the specified number of periods is an integer from 0 to the ratio of the parameter $P_{step}$ to the resource reservation interval.

9. The method of claim 7, wherein the specified number of periods is 0, 1 or the ratio of the parameter $P_{step}$ to the resource reservation interval.

10. The method of claim 3, wherein a resources scheduled by the SA are unavailable, if the resources scheduled by the SA exceeds a threshold value.

11. The method of claim 1,
wherein a subframe n' associated with the subframe n is a first subframe which belongs to a PSSCH resource pool in the subframe n and subsequent subframes.

12. The method of claim 1,
wherein the value associated with the resource reservation interval is a multiplication of a parameter $P_{step}$ and a factor of the resource reservation interval,
wherein the parameter $P_{step}$ is a parameter for sidelink transmission, and
wherein the factor of the resource reservation interval is less than 1.

13. The method of claim 12, wherein the factor of the resource reservation interval is ½ or ⅕.

14. A user equipment (UE) for transmitting data, the UE comprising:
a transceiver; and
a processor coupled with the transceiver and configured to control to:
receive, in a subframe m, a scheduling assignment (SA) within a range of a value associated with a resource reservation interval before the UE determines, in a subframe n, resources for a physical sidelink shared channel (PSSCH) transmission,
determine, in the subframe n, the resources for the PSSCH transmission based on the SA, and
transmit data in the resources for the PSSCH transmission,
wherein a range between the subframe n and the subframe m is less than or equal to the value associated with the resource reservation interval.

15. The UE of claim 14, wherein the processor is further configured to:
identify a set of candidate single-subframe resources, and
identify one or more single-subframe resources to be excluded from the set of the candidate single-subframe resources based on the one or more single-subframe resources, wherein the one or more single-subframe resources are overlapped with resource blocks determined according to the SA,
wherein one or more subframes in which the one or more single-subframe resources are located are determined based on the resource reservation interval and a subframe in which the candidate single-subframe resource is located, and
wherein the resource for the transmitting the data is selected based on candidate single-subframe resources remaining in the set of the candidate single-subframe resources.

16. The UE of claim 15, wherein the processor is further configured to:
sense, within a sensing window, the SA,
measure a received power based on the SA, and
sense a received energy of each sub-channel of each candidate single-subframe, and
wherein the candidate single-subframe resource is identified further based on the sensed SA, the received power and the received energy.

17. The UE of claim 16,
wherein the processor is further configured to reserve a specified number of periods for resource selection, at the resource reservation interval, according to the candidate single-subframe resources remaining in the set of the candidate single-subframe resources, and
wherein the resource reservation interval is indicated by the SA.

18. The UE of claim 17, wherein the specified number of periods for the resource selection is indicated by the SA.

19. The UE of claim 14,
wherein a subframe n' associated with the subframe n is a first subframe n belongs to a PSSCH resource pool in the subframe n and subsequent subframes.

20. The UE of claim 14,
wherein the value associated with the resource reservation interval is a multiplication of a parameter $P_{step}$ and a factor of the resource reservation interval,
wherein the parameter $P_{step}$ is a parameter for sidelink transmission, and
wherein the factor of the resource reservation interval is less than 1.

* * * * *